3,012,176
ELECTRICAL CAPACITORS
Kenneth George Daniel Williams, Ronald Christopher Smith, and Peter Edward Graham, London, England, assignors to A. H. Hunt (Capacitors) Limited, London, England, a British company
Filed Mar. 26, 1956, Ser. No. 573,892
Claims priority, application Great Britain Mar. 29, 1955
15 Claims. (Cl. 317—258)

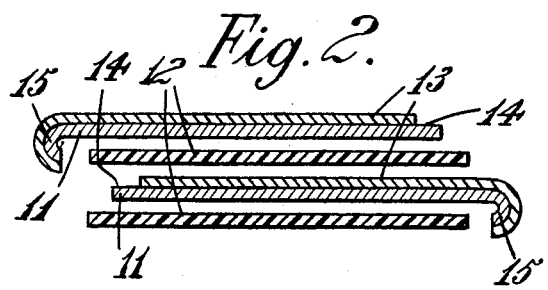
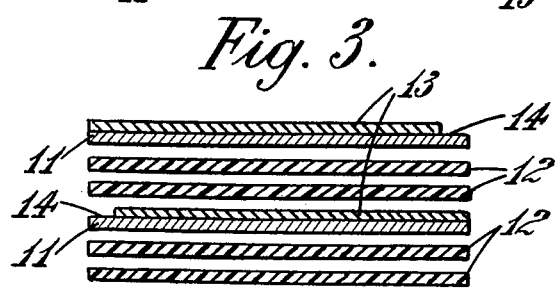
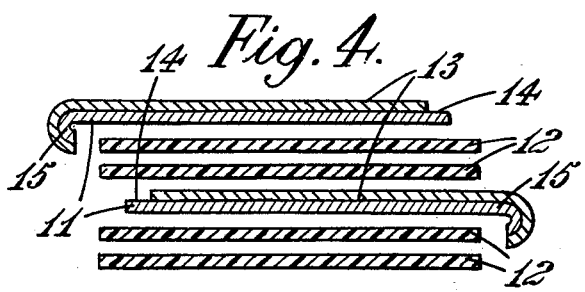
INVENTORS
KENNETH G.D. WILLIAMS
RONALD C. SMITH
PETER E. GRAHAM
By Watson, Cole, Grindle & Watson
ATTORNEYS

United States Patent Office 3,012,176
Patented Dec. 5, 1961

This invention relates to electrical capacitors, and concerns those of the kind in which the dielectrics comprises a thin flexible web or webs of synthetic plastic film.

It is known that plastic materials, for example polyethylene terephthalate, polytetrafluoroethylene, polystyrene, etc., which can be obtained in the form of thin films, possess excellent properties for use as dielectrics. However, owing to the inevitable presence of flaws in some of these films, caused mainly by inclusions of dust particles during manufacture, it is not always possible to make up satisfactory capacitors comprising metal foil electrodes interleaved with single thicknesses of plastic film dielectric. Moreover, the use of two such film thicknesses to avoid coincidence of flaws is not economical as the plastic film is a relatively expensive item.

Capacitors have been made in which the electrodes consist of layers of metallisation deposited on the plastic film thinly enough to enable the well-known action of self-healing to take place around any flaws occurring in the plastic dielectric, the thickness of metal being between 20 and 100 millimicrons. Metallisation of the films is, however not easy in some cases, particularly with lower-melting point plastics when the heat necessarily applied in the metallising process renders it difficult or impossible to carry it out without damaging the film. Also, good adhesion of the metallisation is not always obtained, and special techniques are generally required for metallising and subsequently handling the films. It is an object of the invention to overcome these difficulties.

According to the present invention, an electrical capacitor comprises one or more layers of flexible plastic film dielectric, and paper dielectric metallised on one face. This use of paper as a carrier for the metallisation enables the self-healing characteristic of thin metallised layers to be maintained, while the paper provides additional dielectric thickness.

It has previously been proposed to employ paper bearing metallisation in capacitors having plastic film dielectric, but in that case the paper did not itself form any part of the dielectric but was in the field-free space of the capacitor, the paper preferably having electrode metallisation on both faces kept at the same potential.

Various embodiments of the invention will now be described by way of example.

Reference will be had to the accompanying diagrammatic drawings, in which:

FIGURE 1 is a cross-section through the dielectric strips and metallisation which are wound up to make one form of capacitor, FIGURE 2 shows a modification of the arrangement of FIGURE 1, FIGURE 3 is a cross-section through the dielectric strips and metallisation which are wound up to make another form of capacitor, and FIGURE 4 is a modified arrangement of FIGURE 3.

Referring firstly to FIGURE 1, a roll capacitor is wound from two layers or strips of metallised paper 11, interleaved with two single layers of strips of flexible plastic film dielectric 12. Each paper strip 11 is metallised over one face only with metallisation 13, so that one side of each plastic strip 12 is in contact with metallisation and the other with paper. The metallisation 13, which is thin enough to possess the characteristic of self-healing, is continuous all over the one face of each paper strip, with the exception of an unmetallised margin 14 down one edge, and the strips 11, 12 are assembled so that successive paper strips 11 have their unmetallised margins 14 on opposite edges. Thus, after winding, the electrodes constituted by the separate layers of metallisation on the different paper strips extend first up to one end of the roll and then up to the other, alternately. Terminal connections of opposite polarity can then be made by spraying metal, such as copper, on to the roll ends in the well-known manner.

If desired, each paper strip 11 may be caused to project at the end of the roll to which the metallisation 13 it bears extends, either by staggering the paper strips alternately from side to side, or by making each wider than the plastic strips, or both as shown in FIGURE 2. The projecting edges 15 can then be turned over with the metallisation 13 on the outside of the turn, so as to afford more extensive surfaces for making the terminal connections.

Capacitors with plastic dielectric only do not require impregnation of the dielectric, but in the case of those according to this invention, the paper part of the dielectric is impregnated with a suitable material, which may be chosen to increase the dielectric constant. If the impregnating material used is a synthetic polyester resin, employed in an unpolymerised liquid form and subsequently polymerised in the roll, the capacitor will stand high temperatures since there is no tendency for the resin impregnating material to melt. Furthermore, a resin case can be moulded round the capacitor roll without melting out the impregnating material.

Capacitors suitable for higher working voltages can be obtained by using thicker plastic films, or several contiguous layers of plastic film 12 between each consecutive pair of metallised paper strips 11, as shown in FIGURES 3 and 4.

Capacitors of the kind described in which each pair of electrodes of opposite polarity have between them dielectric comprising at least one strip of plastic film plus a strip of impregnated paper, have a number of practical advantages. Thus the difficulties peculiar to the metallisation of plastic films, as distinct from paper, are eliminated.

The advantage of higher working voltages given by the use of plastic dielectric can be obtained without the need for doubling the relatively expensive plastic film. For example, metallised paper eight microns in thickness, plus plastic film eight microns in thickness, gives a working voltage at a given temperature several times that obtained by using eight-micron metallised paper plus eight-micron inter-leaving paper, while the former combination is a good deal cheaper than eight-micron metallised plastic plus eight-micron interleaving plastic.

As a production advantage no new technique for winding is required, the standard machines and technique for winding metallised paper being suitable. The combination of metallised paper and plastic film is easier to wind than plastic films with foil electrodes interleaved or other combination in which the dielectric is plastic alone, since the resilience of the paper helps to prevent creasing of the plastic film during winding.

In heavy duty capacitors, where it is necessary to turn over the metallised strip edges in the manner hereinbefore described to give strong terminal connections, this is extremely difficult with metallised plastic films but quite simple with metallised paper. If the ends of the capacitor rolls are sprayed with copper to make the terminals, soldering of the end connections is facilitated, since the paper withstands the heating due to the soldering better than unsupported plastic film.

Starting and finishing of capacitor winding can be speeded up, since, as the electrodes are carried on the paper, this can be torn away at the start and finish of the wind, whereas in the case of plastic the film has to be cut by scissors or other suitable mechanical means. The number of cutting operations is therefore reduced. Unlike all-plastic dielectric capacitors, the capacity can be adjusted after winding by the use of alternative impregnating materials.

We claim:

1. An electrical capacitor comprising strips of dielectric material with at least three electrodes in the form of adherent layers of metallization borne on certain of the faces of the dielectric strips, and wherein at least two layers of dielectric are disposed between the electrodes in every pair of opposite polarity one layer being a strip of paper dielectric and the other a strip of synthetic plastic film dielectric, and only the paper strips bear the layers of electrode metallization, the plastic film dielectric being entirely unmetallized, the dielectric material between each of the adjacent electrodes being uniform as to material and thickness.

2. An electrical capacitor comprising a roll wound from at least three strips of paper dielectric, each bearing a layer of adherent metallization on one face and the three layers of metallization constituting capacitor electrodes, together with at least two interleaving strips of synthetic plastic film dielectric which bear no metallization, the layers of electrode metallization of opposite polarity being separated throughout the roll by at least two intervening layers of dielectric one of which is provided by the paper strip bearnig one of the electrodes and the other by one of the synthetic plastic strips, the dielectric material between each of the adjacent electrodes being uniform as to material and thickness.

3. A capacitor as claimed in claim 2, wherein the metallised faces of the paper strips have unmetallised edge margins, with the paper strip or strips bearing electrode metallisation of one polarity having the metallisation extending up to one edge of the strip, and the paper strip or strips bearing electrode metallisation of the opposite polarity having the metallisation extending up to the opposite edge, to enable terminal connections to be made to the ends of the capacitor roll after it is wound.

4. A capacitor as claimed in claim 2, wherein the metallised paper strips are arranged so that they have side margins projecting out beyond the side edges of the plastic strips, with the paper strip or strips bearing electrod metallisation of one polarity having their projecting side margins at one side, and those bearing electrode metallisation of the opposite polarity at the other side, and the projecting side margins are turned over with the metallisation outward to provide a larger surface for the connection of terminals.

5. A capacitor as claimed in claim 1, wherein there is more than one unmetallized plastic dielectric strip between adjacent metallised paper strips.

6. A capacitor as claimed in claim 1, wherein the paper dielectric is impregnated with a polymerizable synthetic resin material.

7. A capacitor as claimed in claim 1, wherein the plastic dielectric is polytetrafluoroethylene.

8. A capacitor as claimed in claim 1, wherein the plastic dielectric is polyethylene terephthalate.

9. A capacitor as claimed in claim 1, wherein the plastic dielectric is polystyrene.

10. An electric capacitor comprising at least three paper dielectric strips, each strip bearing on one face an adherent layer of metallization, the layers of metallization constituting capacitor electrodes, and wherein between the paper of one strip and the metallization on the next adjacent strip is interposed at least one strip of synthetic plastic film dielectric, the dielectric material between each of the adjacent electrodes being uniform as to material and thickness.

11. An electrical capacitor as claimed in claim 10 wherein a single strip of synthetic plastic dielectric is interposed between the said paper of one strip and the said metallization on the other strip of the adjacent electrodes.

12. An electrical capacitor according to claim 10 wherein two strips of synthetic plastic film dielectric are interposed between the paper of one strip and the metallization on the other strip of the adjacent electrodes.

13. An electrical capacitor comprising a roll wound from at least three strips of paper dielectric, each strip bearing a layer of adherent metallization on one face, the layers of metallization constituting capacitor electrodes of opposite polarity, and wherein the said layers of metallization are separated throughout the roll by at least two intervening dielectric strips, one of which is provided by the paper strip bearing one of the electrodes and the remainder of the intervening dielectric being at least one strip of synthetic plastic material, the dielectric material between each of the adjacent electrodes being uniform as to material and thickness.

14. An electrical capacitor as claimed in claim 13 wherein the remainder of the intervening dielectric consists of a single strip of plastic material.

15. An electrical capacitor according to claim 13 wherein the remainder of the intervening dielectric consists of two strips of synthetic plastic material.

References Cited in the file of this patent

UNITED STATES PATENTS

| | | |
|---|---|---|
| 2,740,732 | Peck et al. | Apr. 3, 1956 |
| 2,864,982 | Ruscetta et al. | Dec. 16, 1958 |

FOREIGN PATENTS

| | | |
|---|---|---|
| 437,429 | Great Britain | Oct. 29, 1935 |
| 903,165 | France | Sept. 26, 1945 |
| 994,203 | France | Nov. 14, 1951 |
| 686,293 | Great Britain | Jan. 21, 1953 |
| 723,693 | Great Britain | Feb. 9, 1955 |